(12) United States Patent
Bonebakker et al.

(10) Patent No.: US 7,401,012 B1
(45) Date of Patent: Jul. 15, 2008

(54) METHOD AND APPARATUS FOR CHARACTERIZING COMPUTER SYSTEM WORKLOADS

(75) Inventors: Jan L. Bonebakker, Mountain View, CA (US); Ilya Gluhovsky, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 652 days.

(21) Appl. No.: 11/111,152

(22) Filed: Apr. 20, 2005

(51) Int. Cl.
*G06F 17/50* (2006.01)
*G06F 9/45* (2006.01)
*G06F 15/177* (2006.01)
*G06F 15/173* (2006.01)

(52) U.S. Cl. .................. 703/2; 703/22; 707/2; 709/225; 709/226; 709/238; 709/239

(58) Field of Classification Search ....................... 703/2; 707/2; 709/225, 226, 238, 239; 713/201
See application file for complete search history.

(56) References Cited

U.S. PATENT DOCUMENTS

| | | | | |
|---|---|---|---|---|
| 5,442,730 A | * | 8/1995 | Bigus ........................... | 706/19 |
| 5,473,773 A | * | 12/1995 | Aman et al. .................. | 718/104 |
| 5,504,894 A | * | 4/1996 | Ferguson et al. ............... | 707/2 |
| 5,675,739 A | * | 10/1997 | Eilert et al. .................. | 709/226 |
| 5,704,012 A | * | 12/1997 | Bigus ........................... | 706/19 |
| 5,725,652 A | * | 3/1998 | Shulman ..................... | 106/677 |
| 6,823,346 B2 | * | 11/2004 | MacLellan et al. ........ | 707/104.1 |

OTHER PUBLICATIONS

Pallis et al. "A Study on Workload Characterization for a Web Proxy Server" 2003.*

* cited by examiner

*Primary Examiner*—Kamini S Shah
*Assistant Examiner*—Shambhavi Patel
(74) *Attorney, Agent, or Firm*—Park, Vaughan & Fleming LLP

(57) ABSTRACT

One embodiment of the present invention provides a system that characterizes computer system workloads. During operation, the system collects metrics for a number of workloads of interest as the workloads of interest execute on a computer system. Next, the system uses the collected metrics to build a statistical regression model, wherein the statistical regression model uses a performance indicator as a response, and uses the metrics as predictors. The system then defines a distance metric between workloads, wherein the distance between two workloads is a function of the differences between metric values for the two workloads. Furthermore, these differences are weighted by corresponding coefficients for the metric values in the statistical regression model.

21 Claims, 6 Drawing Sheets

METHOD AND APPARATUS FOR CHARACTERIZING COMPUTER SYSTEM WORKLOADS

RELATED APPLICATION

The subject matter of this application is related to the subject matter in a co-pending non-provisional application by Ilya Gluhovsky and Jan L. Bonebakker filed on the same day as the instant application entitled, "Method and Apparatus for Computing a Distance Metric between Computer System Workloads," having Ser. No. 11/111,151, and filed Apr. 20, 2005.

BACKGROUND

The present invention relates to techniques for characterizing computer system workloads.

Workload characterization and performance analysis are important factors in computer system design. Design tradeoffs which are made during the development of a new computer system are typically based on a thorough analysis of the way in which a small number of workloads run on existing computer systems. It is assumed that this small collection of workloads is representative of the majority of the commercial workloads. A major challenge for the designers of computer systems is therefore to select a set of benchmarks that best illustrate the behavior of the commercial workloads they are targeting.

Workload characterization involves building a compact model that accurately and repeatably describes a workload and captures its static and dynamic behavior. Performance analysis for proposed designs is usually carried out using performance models driven by stimulus from one or more benchmarks of interest. For example, in the early stages of system analysis, memory hierarchy behavior is typically characterized using "per-instruction rates" of cache miss transaction sequences. These rates are obtained using cache simulations of instruction streams or bus traces.

Additionally, memory-level parallelism is characterized and infinitely large cache behavior parameters are used. They are obtained through processor simulation using instruction streams. Traces can also be used to study disk and network activity.

Trace collection is therefore a prerequisite for system performance analysis. Unfortunately, collecting a trace is a costly and arduous task that requires significant machine resources and human effort. Consequently, performance analysis as outlined above is typically feasible only for a handful of benchmarks. However, conclusions from performance analysis are clearly desirable for a large number of customer workloads. One solution to this problem is to approximate workload behavior and to compare conclusions with those obtained for a thoroughly studied benchmark.

Because system architectures are typically optimized for a few benchmarks that are thought to be representative of a number of important workloads, it is desirable to determine which workloads are well approximated by a benchmark, or, more generally to determine what portion of the total "behavior space" each benchmark represents.

SUMMARY

One embodiment of the present invention provides a system that characterizes computer system workloads. During operation, the system collects metrics for a number of workloads of interest as the workloads of interest execute on a computer system. Next, the system uses the collected metrics to build a statistical regression model, wherein the statistical regression model uses a performance indicator as a response, and uses the metrics as predictors. The system then defines a distance metric between workloads, wherein the distance between two workloads is a function of the differences between metric values for the two workloads. Furthermore, these differences are weighted by corresponding coefficients for the metric values in the statistical regression model.

In a variation on this embodiment, prior to building the statistical regression model, the system performs a linear analysis on the collected metrics to eliminate metrics that highly correlated with other metrics, thereby reducing the number of metrics that need to be considered.

In a variation on this embodiment, the performance indicator for the statistical regression model includes an instruction count for the number of instructions executed on the computer system.

In a variation on this embodiment, the statistical regression model represents the instruction count as an additive function of the metrics plus noise, wherein the noise represents effects not captured by the metrics.

In a variation on this embodiment, after building the statistical regression model, metrics that do not explain the performance indicator are not subsequently used.

In a variation on this embodiment, the system uses the distance metric to cluster a set of workloads, and then identifies one or more representative workloads for each cluster.

In a variation on this embodiment, the system identifies a set of representative benchmarks by using the distance metric to minimize a maximum distance between representative benchmarks and a set of workloads that the benchmarks are meant to cover.

In a variation on this embodiment, the system uses the distance metric to classify a customer's workload at a customer's site.

In a variation on this embodiment, the system selects a benchmark that approximates a customer's workload, and then selects an architecture for the customer which is optimized for the selected benchmark, and is hence likely to perform well on the customer's workload.

In a variation on this embodiment, collecting the metrics involves collecting the metrics from hardware counters on the computer system.

One embodiment of the present invention provides a system that computes a distance metric between computer system workloads. During operation, the system receives a dataset containing metrics that have been collected for a number of workloads of interest. Next, the system uses splines to define bases for a regression model which uses a performance indicator y as a response and uses the metrics (represented by a vector x) as predictors. The system then fits the regression model to the dataset using a penalized least squares (PLS) criterion to obtain functions $f_1, \ldots, f_P$, which are smooth univariate functions of individual metrics that add up to the regression function $f$, such that $$y = f(x) + \varepsilon = \sum_{i=1}^{P} f_i(x_i) + \varepsilon,$$

wherein $\varepsilon$ represents noise. Finally, the system uses the fitted regression function to define the distance metric.

In a variation on this embodiment, the PLS criterion includes a roughness penalty, which factors in roughness of the fit in addition to closeness of the fit to the dataset. This PLS criterion can be expressed as $$\sum_{i=1}^{N}(y_i-f(x_i))^2+\sum_{p=1}^{P}\lambda_p\int(f_p''(x_p))^2dx_p,$$

wherein the second summand is the roughness penalty, wherein the integration is over the domain of interest, and wherein the $\lambda_p$ are roughness penalty parameters.

In a variation on this embodiment, while fitting the regression model to the dataset, the system is configured to iteratively: fit the regression model via quadratic programming to obtain univariate functions $\hat{f}_1, \ldots, \hat{f}_P$; choose $\lambda_1, \ldots, \lambda_P$ via generalized cross-validation for the unconstrained model; and to optimize $$\sum_{i=1}^{N}(y_i-f(x_i))^2+\Lambda\sum_{p=1}^{P}\hat{\lambda}_p\int(f_p''(x_p))^2dx_p,$$

with respect to the overall roughness penalty coefficient $\Lambda$ for the monotonic model with $\lambda_1, \ldots, \lambda_P$ fixed at the previous values.

In a further variation, choosing $\lambda_1, \ldots, \lambda_P$ via generalized cross-validation can involve dropping a metric i from the model and setting the corresponding $\lambda_i$ value to indicate that the metric has been dropped.

In a variation on this embodiment, using the fitted regression function, $$\hat{f}(x)=\sum_{p\in P'}\hat{f}_p(x_p)$$

(wherein P' is the set of remaining metrics) to define the distance metric involves defining the distance between metric vectors u and v (associated with different workloads) as $$\rho(u,v)=\sum_{p\in P'}|\hat{f}_p(u_p)-\hat{f}_p(v_p)|.$$

In a variation on this embodiment, using splines to define bases for the regression model involves using I-splines to define the bases.

DETAILED DESCRIPTION

Figure 1A:
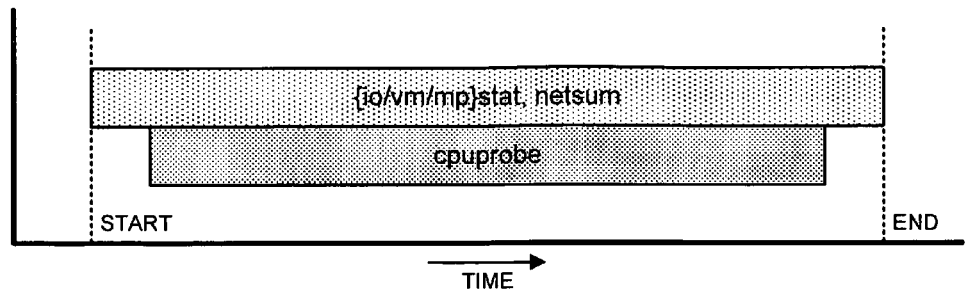
FIG. 1A illustrates a data collection methodology in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as a LAN, a WAN, or the Internet.

Distance Metric

There are many uses for this distance information. For example, if we have an optimized architecture for a thoroughly studied benchmark, and a workload is shown to behave similarly using high-level analysis, it is reasonable to expect that the same architecture will suit that workload. In this respect, it is useful to build a representative collection of thoroughly studied benchmarks and the corresponding collection of optimized architectures, so that most workloads will have a similar counterpart in the collection. We can then suggest fitting architectures to those workloads using appropriate benchmarks. One may also be interested in learning that a certain workload is not going to run well on a specific architecture. This is expected if the workload resembles a benchmark with poor performance on that architecture. Such a workload-architecture mismatch might be useful in identifying new opportunities rather than finding a good existing architecture. One might also find it important to know that for a set of workloads there is no closely matching benchmark. In this case computer system designers might be overlooking an important market segment.

Approximate system performance model analysis might also be possible. For example, if memory behavior of a workload is similar to that of a well studied benchmark A, as suggested by the high level analysis, we might attempt to use benchmark A cache rates as a substitute for unavailable workload cache rates. Furthermore, if we can find a potentially different benchmark B whose processor behavior is similar to that of the workload, one might use the corresponding benchmark B processor abstraction parameters to model memory-level parallelism.

We now introduce our comparison mechanism. Ideally, the comparison mechanism should be simple to be useful. For example, one must not rely on traces for comparison, for that would defeat the goal of compactness and simplicity. Instead, we use hardware counter metrics collected during runtime.

The metrics are the average number of relevant events per second over the sampling interval. The metrics are intended to capture runtime activity that is relevant to performance.

The use of metrics for comparing workloads requires a systematic approach to data collection, which is. Upon collecting these metrics for all workloads of interest, the next step is to infer what metrics actually are predictors performance and to what extent. We do this by building a statistical regression model for the number of executed instructions (instruction count or IC) as the response and all other metrics as the predictors. The idea is that the number of instructions executed is a fair, if not perfect, indicator of performance. Of course, it is well understood that certain instructions do not "propel" the execution forward, but only add to the instruction pathlength. For example, if the only difference between two benchmarks is in the frequency of spins on mutexes, one is unlikely to interpret the difference in the IC as higher performance of the benchmark with more spins. We will show in the following discussion that our regression model separates the effects of, say, cache miss effects from, say, spin locking effects. Thus, the techniques we describe can support both the goal of finding workload similarities based only on "useful" instructions and the goal of including "lost" performance.

Our regression model represents the IC as an additive function of the metrics plus "noise", the part that is not captured by the metrics. For now, let us assume that the model is linear and the noise is small. Upon selecting the statistical model, we are left with only those metrics that affect the IC as suggested by the data. In other words, metrics that do not explain the observed IC are not used. The importance of each metric is then given by the absolute value of its coefficient in the linear model, at least after standardization, so that all metrics are on the same scale.

Our next step is to define the distance between any two workloads. We would like the distance to reflect differences in the workload behavior as they impact performance. Each workload is characterized by its metric vector. The distance measure could then be defined as the absolute value distance between the metric vectors. In doing so, however, all metrics receive equal weights notwithstanding their effects on performance. Our proposal is to weigh their contributions by the absolute value of their coefficients in the linear model. In particular, metrics that do not affect performance do not appear in the distance definition. More generally, for a non-linear additive model, the absolute value differences between the univariate effects are added up.

Once the distances have been determined, it might be instructive to cluster the workloads based on these distances. This helps in visualizing workload similarities by segmenting the space of workloads in hopefully interpretable ways, such as memory intensive workloads, computational/scientific workloads, etc. Clustering also allows one to see if these segments have been explored sufficiently well by checking if each segment contains at least one thoroughly studied benchmark. Linkage clustering is a simple way to accomplish this, since pre-computing the distances is all that is required.

As we have already mentioned, it might be useful to build a collection of thoroughly studied benchmarks, such that no workload under consideration is too far away from at least one of these well studied benchmarks. This problem is a standard minimax problem, as we wish to minimize the maximum distance from the benchmark collection over the workloads. This is often contrasted with the maximin approach, which in this context would mean choosing the collection of benchmarks that are pair-wise least similar.

In the following specification, we describe a system for identifying important benchmark characteristics and how benchmark applications embody them by introducing a mechanism to compare benchmarks and commercial workloads using all or some (e.g. targeting a particular part of the system) easy-to-collect performance relevant metrics.

Data Collection and Analysis System

Figure 1B:
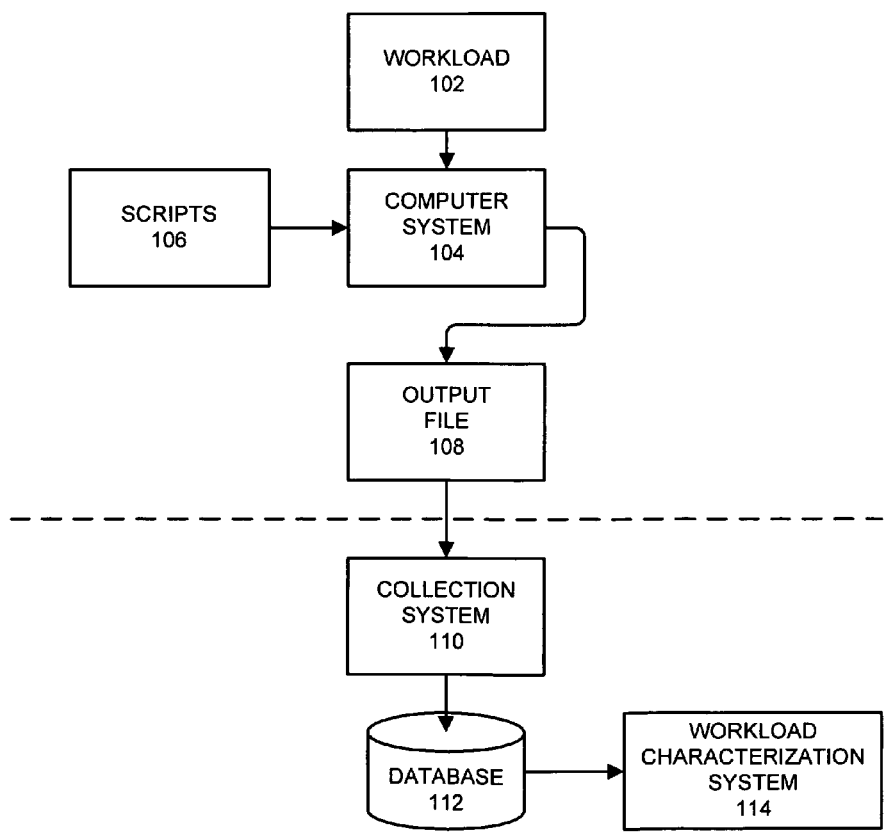
FIG. 1B illustrates a data collection and analysis system in accordance with an embodiment of the present invention.

FIG. 1B illustrates a data collection and analysis system in accordance with an embodiment of the present invention. In this system, a computer system 104 runs a workload 192 under control of an operating system script 106. This generates an output file 108 containing collected metrics. Note that computer system 104 can include any type of computer system or computational device under test.

Next, a collection system 110 processes output file 108 and stores the processed data in database 112, which contains collected metrics from a number of workloads.

Finally, a workload characterization system 114 characterizes the workloads as is described in more detail below.

Process of Defining a Distance Metric

Figure 1C:
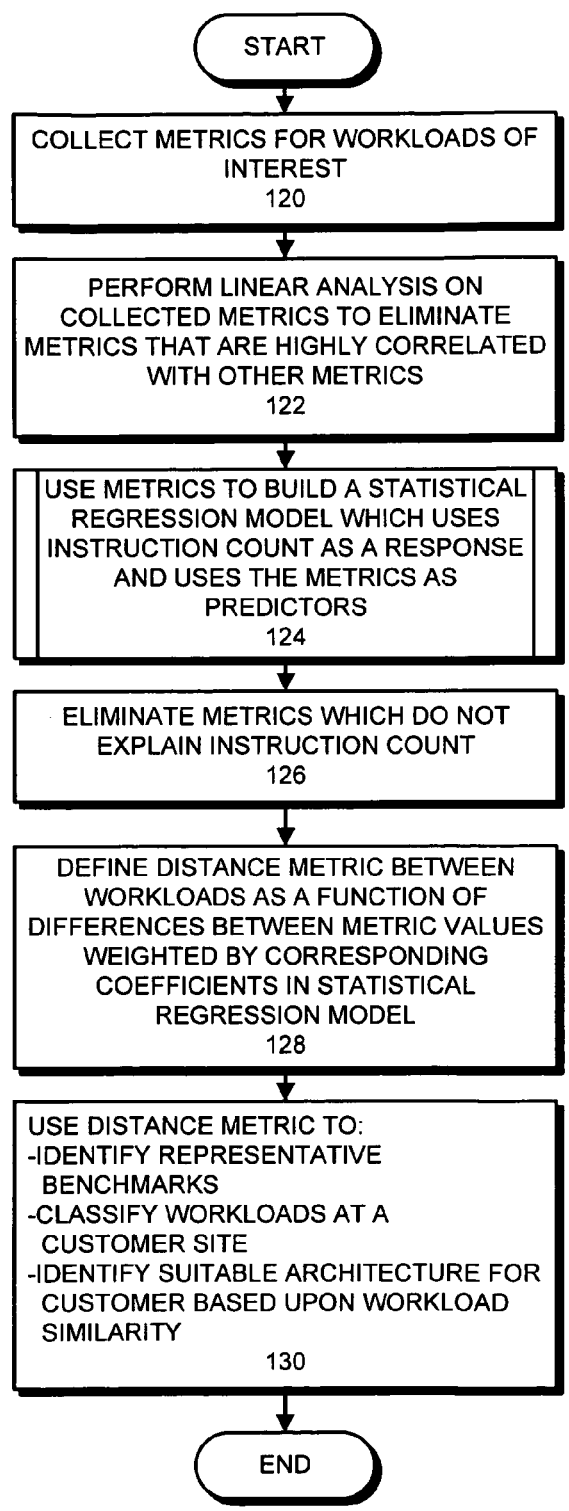
FIG. 1C presents a flow chart illustrating the process of defining and using a distance metric in accordance with an embodiment of the present invention.

FIG. 1C presents a flow chart illustrating the process of defining and using a distance metric for computer system workloads in accordance with an embodiment of the present invention. The system starts by collecting workloads of interest as is described above with reference to FIG. 1B (step 120). Next, the system performs a linear analysis on the collected workloads to eliminate metrics that are largely correlated with other metrics (step 122). This reduces the number of metrics that need to be considered during subsequent operations.

Next, the system builds a statistical regression model, which uses instruction count as a response and uses the metrics as predictors (step 124). The system then eliminates metrics which do not explain the instruction count (step 126), which further reduces the metrics that need to be subsequently considered.

The system then defines a distance metric, which can be used to measure the distance between workloads as a function of differences between metric values weighted by corresponding coefficients in the statistical regression model (step 128). Finally, the system can use the distance metric for a number of different purposes (step 130). For example, the system can use the distance metric to identify a set of representative benchmarks for a much larger set of workloads. The system can also use the distance metric to classify workloads at a customer's site. The system can additionally identify a suitable architecture for a customer based on workload similarity. (Note that the present invention allows one to pick a benchmark that best approximates a customer workload. Therefore, an architecture optimized for that benchmark is likely to perform well for the customer.)

Figure 1D:
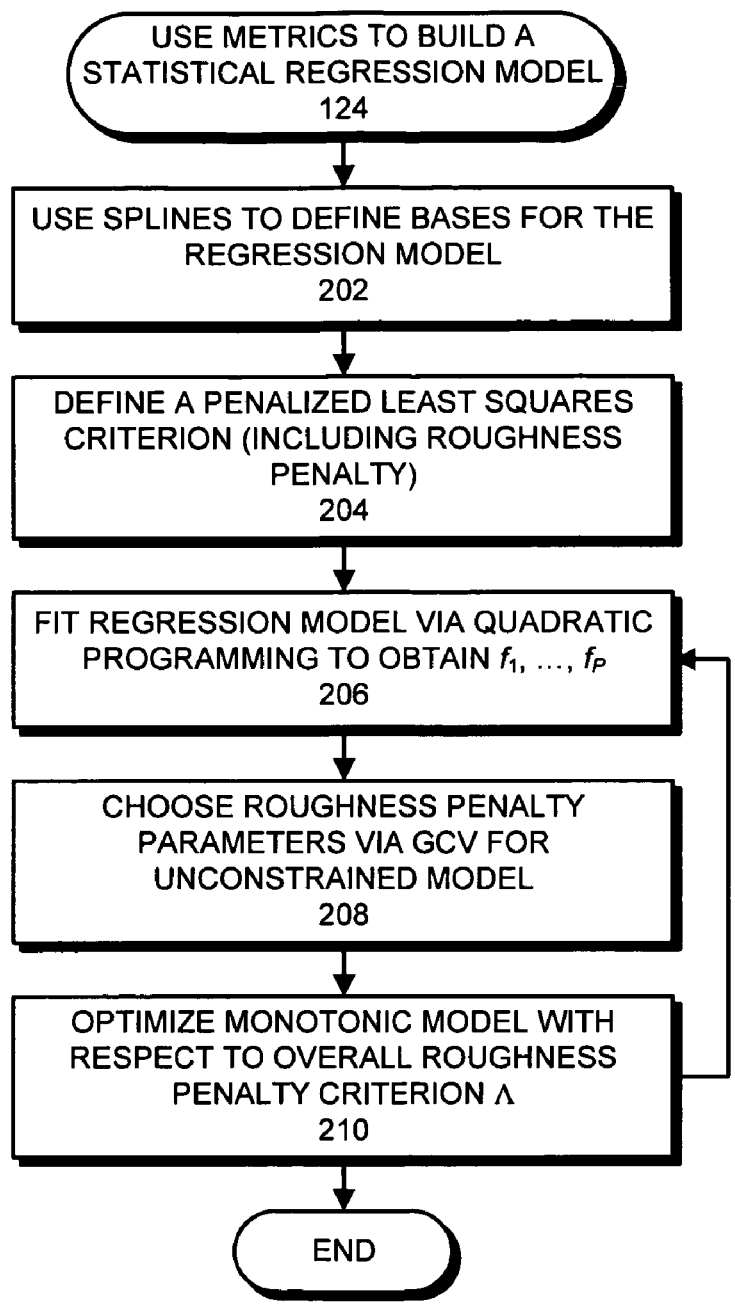
FIG. 1D presents a flow chart illustrating the process of using metrics to build a statistical regression model in accordance with an embodiment of the present invention.

Referring to FIG. 1D, the process of building a statistical regression model mentioned in step 124 above involves a number of steps. First, the system uses splines (such as a B-spline or an I-spline) to define bases for a regression model (step 202). Next, the system defines a penalized least squares (PLS) criterion including a roughness penalty for the regression model (step 204). This PLS criterion can be expressed as, $$\sum_{i=1}^{N}(y_i - f(x_i))^2 + \sum_{p=1}^{P} \lambda_p \int (f_p''(x_p))^2 dx_p,$$

wherein the second summand is the roughness penalty, wherein the integration is over the domain of interest, and wherein the $\lambda_p$ are roughness penalty parameters.

Next the system iteratively performs a number of operations. These operations include: fitting the regression model via quadratic programming to obtain univariate functions $f_1, \ldots, f_P$ (step 206); choosing roughness penalty parameters $\lambda_1, \ldots, \lambda_P$ via generalized cross-validation for the unconstrained model (step 208); and optimizing $$\sum_{i=1}^{N}(y_i - f(x_i))^2 + \Lambda \sum_{p=1}^{P} \hat{\lambda}_p \int (f_p''(x_p))^2 dx_p$$

with respect to the overall roughness penalty coefficient $\Lambda$ for the monotonic model with $\lambda_1, \ldots, \lambda_P$ fixed at the previous values (step 210).

The above-described operations are described in more detail below.

Data Collection Methodology

To achieve the goal of this work sufficient data must be collected in a consistent manner. One embodiment of the present invention provides a standardized methodology for data collection. In this methodology, special care is taken to include a method to correct for idle instructions during data collection as well as to make sure that perturbation levels due to measurement do not exceed 3%. This standardized data collection methodology guarantees a small overhead due to the collection tools as well as a consistent set of data. Combined with the standardized reduction process the data are reduced to a form ready for the core of the overall method, the comparative analysis.

Requirements and Constraints on Data Collection

The data collection process ideally satisfies the following requirements:
1. Collection must not significantly perturb the system.
2. All relevant data must be collected in each run of each workload. Similarity analysis is much more accurate when the same metrics are available for each workload; that is, there are no missing data.
3. Each workload must be in steady state while data are sampled.
4. Data are captured from systems running real workloads. Therefore, variation in metric values is to be expected. Only by sampling data with high enough frequency and over long enough time periods can we get a reasonable estimation of the steady state value for each metric in a workload.

These requirements are consistent with good experiment setup. However, special attention must be given to the relationship between the sampling frequency and the duration of measurement. The sampling frequency is an important characteristic that defines the granularity that can be achieved during collection while the duration of measurement determines the volume of data. It is well known in the fields of workload characterization and performance analysis that collecting accurate data at the desired level of granularity conflicts with our goal of not perturbing the original workload. This is the computing equivalent of Heisenberg's uncertainty principle which states that any observation changes the state of the observed system. However, reducing the level of perturbation by decreasing the sampling frequency also increases the granularity of the data. Our efforts have concentrated on finding the right balance between perturbation and detail and we have chosen to accept 3% as the maximum level of overall workload perturbation due to our instrumentation. That is, we require that neither the execution time nor the throughput of the workload differ by more than 3%, ($p=|v_u - v_p|/v_u*100\%$), between un-instrumented ($v_u$) and instrumented ($v_p$) runs. Observations made on CPU bound workloads as a function of the instrument sampling interval indicate that any interval less than five seconds creates undesired perturbation levels. The combined effect of all measurement tools and the desire for sufficient data granularity lead to about ten seconds (0.1 Hz) as a good choice for minimizing perturbation while maximizing the number of samples. In one embodiment of the present invention, the sampling duration is limited to between five and twenty minutes.

Collection and Analysis Methodology

The data collection methodology can be controlled from a single shell script. This script starts the collection tools at the correct time for the appropriate duration and keeps track of the start and finish times. The script also sets the process priority level of the collection tools to the UNIX real-time class. Normal UNIX processes live in the time-share class. Putting the tools in the real-time class gives the tools a higher priority than the workload. While running the tools in the real-time class minimizes the chance of the workload perturbing the data collection, the reverse is not true. Because the tools run in the real-time class, they will always interrupt the workload and therefore increase the overall perturbation. The data collection tools (included by default in Solaris 9/SunOS 5.9 except where noted) are:

mpstat reports per-processor or per-processor-set OS level statistics like mutex stalls, cross calls, context switches, system utilization etc.

vmstat reports virtual memory statistics regarding kernel threads, virtual memory, disks, traps, and CPU activity.

iostat reports terminal, disk, and tape I/O activity, as well as CPU utilization. Here iostat is used in disk-only mode to report the activity of all attached disks.

netstat reports on per network interface statistics: packet counts, average packet size and throughput.

cpustat allows CPU performance counters to be used to monitor the overall behavior of the CPUs in the system. cpustat collects data from the hardware counters in exclusive, non-exclusive and combined contexts, in combination with a soaker thread to prevent idle time from perturbing kernel statistics.

cpuprobe (not part of Solaris 9/SunOS 5.9) an improved version of cpustat that has a lower perturbation effect on the workload due to a shorter pathlength while measuring and lower impact on the cache, especially L1 instruction and data. cpuprobe also integrates features that assist in the correction for idle time. The improvements in cpuprobe have been ported to cpustat and are included in Solaris 10/SunOS 5.10.

All the tools report data in ASCII format and store the produced data in files on local disk or in a temporary, in memory file system. Each data file contains the start time (at per second resolution) of the tool allowing for proper alignment of the collected data during post-processing.

Data Collection Script

As mentioned above, the data collection script performs a set of administrative functions to optimize data collection such as running in real time mode, determining hardware configuration, etc. More important however is the sequencing of the data collection tools. The data collection tools fall into two categories:

minimally perturbing tools have insignificant perturbation (<0.3%) of the workload when sampling at 0.1 Hz and do not interfere with each other. The tools are iostat, mpstat, vmstat and netstat.

perturbing tools perturb the workload (<3%) but also influence the statistics collected by the other tools, these tools are cpuprobe and cpustat with the soaker.

In order to quantify the level of impact on the collected data by the perturbing tools, the script does not start all tools at the same time. First, the minimally perturbing tools are started. Then after a delay of 5% of the duration of the measurement, with a minimum of 30 seconds and a maximum of 5 minutes, the perturbing tools are started. The same is done is reverse order with the same delay before the end of measurement as is illustrated in FIG. 1A. This sequencing of the data collection allows us to measure the influence on the system statistics caused by the perturbing tools; this is done by comparing the minimally perturbing statistics over the main period with those over the initial and the final delay periods.

Sampling Hardware Counters Using cpustat cpustat is a Solaris specific utility that interfaces with the hardware counters on the processor. cpustat provides access to the hardware counters in both privileged (kernel) and un-privileged modes (user). The combination of privileged and un-privileged is a system wide statistic (system). Note that the UltraSPARC III family of processors provides two hardware counters per CPU that can be used to monitor forty different events (e.g. instruction count, cycle count, cache misses, branch mispredictions, etc.). When cpustat is invoked, it must be provided with a list of event pairs and their context (user, kernel, system) that need to be measured. cpustat then measures each pair for the duration provided on the command line.

Correcting for Idle Time when Using cpustat

In one embodiment of the present invention, the processor has no special instructions to handle idle time. Instead, it relies on the Operating System (OS) to generate a steady stream of instructions when there is no other work. During idle time, the operating system therefore executes a kernel idle loop to keep the processor busy. Since the processor cannot distinguish between the idle empty instructions and work of interest, neither can the hardware counters. For the counters of interest, the instruction and cycle counts are most significantly impacted by the idle instructions, e.g. the presence of idle time greatly increases the instruction and cycle counts. Other hardware counters, such as L1 miss count, are not impacted by the idle instructions because they do not miss in the cache. Because most analysis of the performance of processors is done relative to the instruction or cycle count, the effect of idle time is to bias this analysis by underestimating the CPI (cycles per instruction), miss rates and similar metrics. Correcting for this bias is necessary to determine the real level of work done by a processor due to a workload. Since the kernel idle loop always executes in privileged mode on the processor, we need a mechanism to prevent the idle loop from executing when we are measuring counters in the privileged context. This mechanism, named a "soaker," creates a separate thread that executes an empty loop in non-privileged mode and runs at a priority level just higher than the kernel idle loop. The net effect of this "soaker" thread is to prevent the kernel idle loop from issuing instructions while we are measuring the kernel, thus removing the contribution of the kernel idle loop to the hardware counters we are sampling. Running a soaker thread obviously increases the load on the system, but this is largely compensated for by running the thread at the lowest scheduler priority and trusting the OS scheduler. For multi-processor systems a soaker thread is attached to each processor.

The three contexts that are used to measure the hardware counters are user, kernel and system context. user and kernel map to the non-privileged and privileged modes respectively, the system context is the combination of these two contexts. Obviously we are not capable of correcting the hardware counters in the system context because there is nowhere to hide the idle instructions. The difference between user+kernel (with soaker) and system metrics (without soaker) provides an indication of how idle the CPU is for a given workload. A small difference between user+kernel and system indicates the absence of idle time and therefore an efficient use of the CPUs.

Perturbation Levels of cpustat with Soaker

Early versions of our data collection script used a separate soaker program which was resumed or suspended depending on the privileged or non-privileged context cpustat would sample in. This required restarting cpustat at every time the context changed to kernel from user or system. The soaker thread was suspended for the duration of the user and system measurements and reactivated for the kernel measurements to avoid restarting the soaker program. The main issue with this approach was the additional burden of stopping and restarting cpustat. Since this additional burden was the predominant cause of overhead during measurement we improved cpustat to reduce this overhead (see Appendix A). Only a few data collections runs with the cpustat+soaker combination failed to adhere to the 3% maximum perturbation level and were therefore rejected from our sample.

Sampling Hardware Counters Using cpuprobe

With cpuprobe sampling the hardware counters only required the list of event-pairs, the sampling duration (0.1 second), the number of samples and the sampling period (ten seconds). Note that cpuprobe internalizes most of the infrastructure needed by cpustat.

Data Collection and Reduction

The data are collected under the assumption that the workload stays in the same phase during collection or that the phases are long relative to the sample time, an assumption that must be validated during analysis. Before the similarity analysis can take place, the collected data must be reduced to a workload representation. This reduction process is a conversion of the ASCII data files to a format suitable for import into a database along with time stamps. If there are any "bad patches" in the data, these patches are removed immediately after import. A "bad patch" is defined as clearly anomalous behavior, e.g. a sudden and unique spike in disk or network activity. After a workload has been imported into the database and the identified bad patches removed, the mean for each metric over the duration of the measurement period is calculated and loaded it into a summary table. This summary table is the collection of metrics used for our analysis and contains additional information like the run name and host name, number of processors in the system, the clock speed (invariant) and the cache size (invariant). In addition to the mean values in the summary table, an assessment of the quality of the data is also calculated. This assessment is made by first verifying that the coefficient of variation, defined as the ratio of the standard deviation and the mean, $$\frac{\sigma}{\mu},$$

is less than a threshold to indicate that the collected data varies little around the mean. Second we verify that there are no upward or downward trends in the metrics of interest. The presence of trends is determined by calculating the linear least squares fit through all the data points, and carrying out a hypothesis test for whether the slope is non-zero.

Additive Model for the Instruction Count

In this section, we give details of building an additive regression model for explaining the instruction count (IC) from the other metrics. This model is used to determine what metrics affect performance and to what extent. Denote the P-dimensional vector of metrics excluding the IC by x and the scalar IC by y. By definition, the regression model relates the response y to the predictor vector x. We now introduce the form of the model. We assume that the following additive regression relationship holds:

$$y = f(x) + \varepsilon = \sum_{p=1}^{P} f_p(x_p) + \varepsilon \tag{1}$$

where $f$ is the regression function. The $f_p$ are smooth univariate functions of individual metrics that add up to $f$ and $\varepsilon$ is noise, the part of the IC that is not explained by the $f_p$. The model is fitted using data pairs $(x_i, y_i)$, $1 \leq i \leq N$, where index i runs over N workloads for which the metric vectors are available. We assume that the noise terms $\varepsilon_i$, the noise components at the data points, are independent and are centered at zero.

We now give an outline of our regression modeling approach. First, we explain how to perform regression using B-splines. Second, we obtain the fit using a penalized least squares (PLS) criterion. Third, the parameters of the PLS are chosen using cross-validation for optimal model selection making the correct tradeoff between matching the data and keeping the model simple. Last, we note that most of the additive effects are expected to be monotone (e.g. higher miss rates result in fewer executed instruction), and we extend our approach to satisfy these monotonicity constraints. We now turn to an in-depth discussion of this approach.

The simplest variant of an additive model is a linear model. In that case, $f_p(u)$ are further assumed to be $a_p u$. Here we will non-parametrically fit (1). We will not make any strong assumptions about the form of the $f_p$'s, such as linearity, polynomial, etc. Instead, we will model the $f_p$'s as splines, a fairly broad class of functions and will find the model in this class that fits the data best. Spline modeling is part of many software packages, such as Matlab and S-Plus. We now define the splines, the fitting criterion, the model selection mechanism, and the goodness-of-fit criterion.

A univariate spline is a piecewise polynomial, whose pieces are glued together smoothly. More precisely, for a knot sequence $t_1 < \ldots < t_m$, a kth order spline coincides with kth order (degree k−1) polynomials between adjacent knots $t_i < t_{i+1}$ and has k−1 continuous derivatives. Splines of order k form a linear space of dimension k+m, where m is the number of knots. B-splines $B_j(x)$ form a convenient basis for this space: they are nonnegative and are strictly positive over at most k+1 knots resulting in banded matrices and efficient computations.

Figure 2:
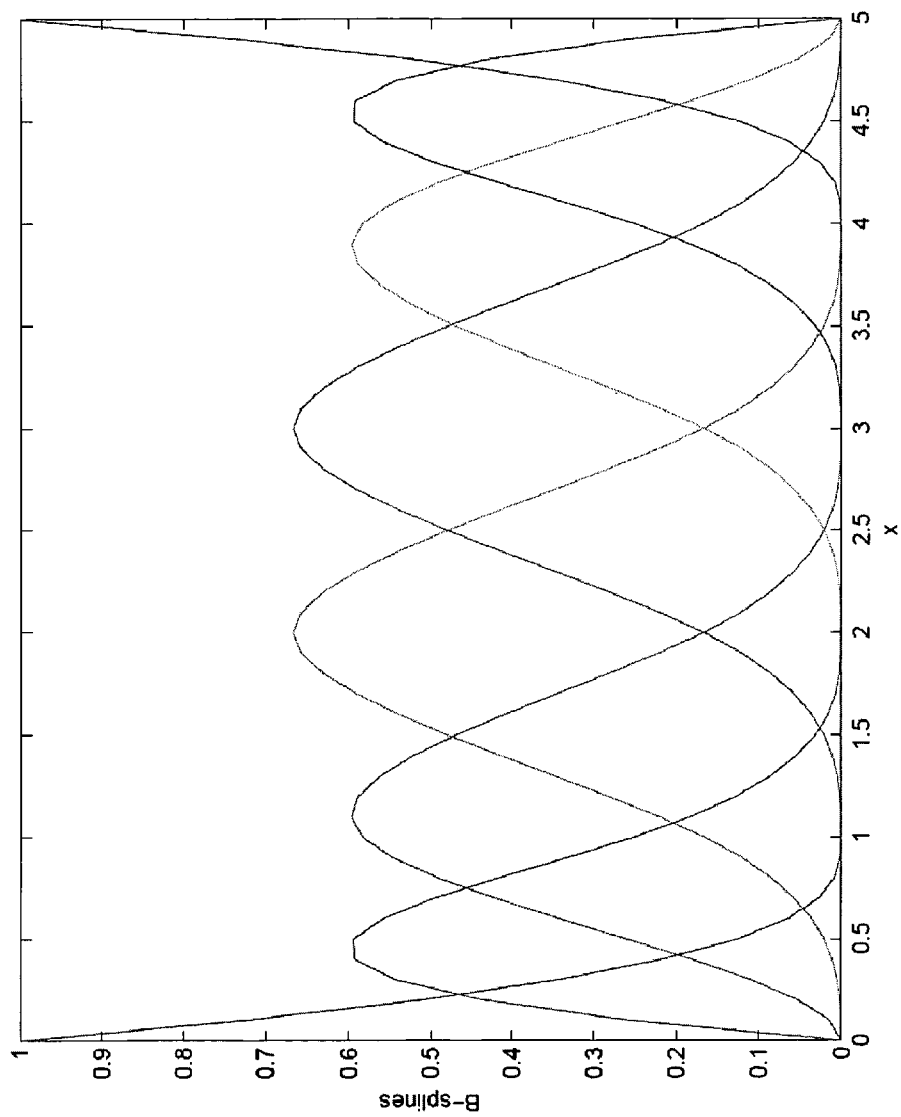
FIG. 2 illustrates a number of B-splines in accordance with an embodiment of the present invention.

Any spline s(x) has representation $$s(x) = \sum_{j=1}^{k+m} B_j(x) \beta_i \tag{2}$$

for some coefficient vector β. B-splines of order k=4 for knot sequence [0,1,2,3,4,5] defined over [0,5] are depicted in FIG. 2.

Thus, if each $f_p$ is modeled as a univariate spline then the model in (1) takes the form $$f(x) = \beta_0 + \sum_p \sum_j \beta_{p,j} B_{p,j}(x_p) \tag{3}$$

The goal now is to choose the best coefficient vector β. The usual least squares approach is to minimize $$\sum_{i=1}^{N} (y_i - f(x_i))^2 \tag{4}$$

with respect to β. Such approach is prone to over-fitting. Including more terms into (3) by, say, increasing the order of the splines or adding more knots necessarily improves (4). However, this does not necessarily mean that the model estimates the true $f$ better. For example, if new data were generated from (1), the least squares penalty of the true model would in general be nonnegative due to the presence of noise. In other words, a highly complex model with many terms is likely to fit part of the noise along with the signal. Therefore, a good model generally makes a compromise between closeness to the data points and complexity of the fit. We will define the fitting criterion to be minimized over β as $$\sum_{i=1}^{N} (y_i - f(x_i))^2 + \sum_{p=1}^{P} \lambda_p \int (f_p''(x_p))^2 dx_p, \tag{5}$$

where the integration is over the domain of interest. Here the second summand is the roughness penalty and $\lambda_p$ are the roughness penalty parameters weighing the roughness of the fit against closeness of the fit to the data. Choosing small p makes the fit approach the data, while a large $\lambda_p$ pushes the $f_p$ towards the best linear component. The fact that each $f_p$ is a piecewise polynomial makes the computation of the second derivatives easy.

It is clear that the penalty (4) is a quadratic form which makes the optimization with respect to β easy. We will see next that the roughness penalty is also a quadratic form. For each p, $$\int (f_p''(x_p))^2 dx_p =$$
$$\int \left( \sum_j \beta_{p,j} B_{p,j}''(x_p) \right)^2 dx_p = \sum_{j,k} \beta_{p,j} \beta_{p,k} \int B_{p,j}''(x_p) B_{p,k}''(x_p) dx_p$$

Thus, upon defining matrix $\Omega_p$ via $$(\Omega_p)_{jk} = \int B''_{p;j}(x_p) B''_{p;k}(x_p) dx_p, \quad (6)$$

we get $$\int (f''_p(x_p))^2 dx_p = \beta_p^T \Omega_p \beta_p,$$

where $\beta_p$ is the vector of coefficients pertaining to $f_p$. Consequently, the fitting criterion (5) is a quadratic form.

We would like to also mention that for computational convenience, the integrals are sometimes replaced by sums either over points spaced uniformly over the domain or the data points $(x_i)_p$.

Figure 3:
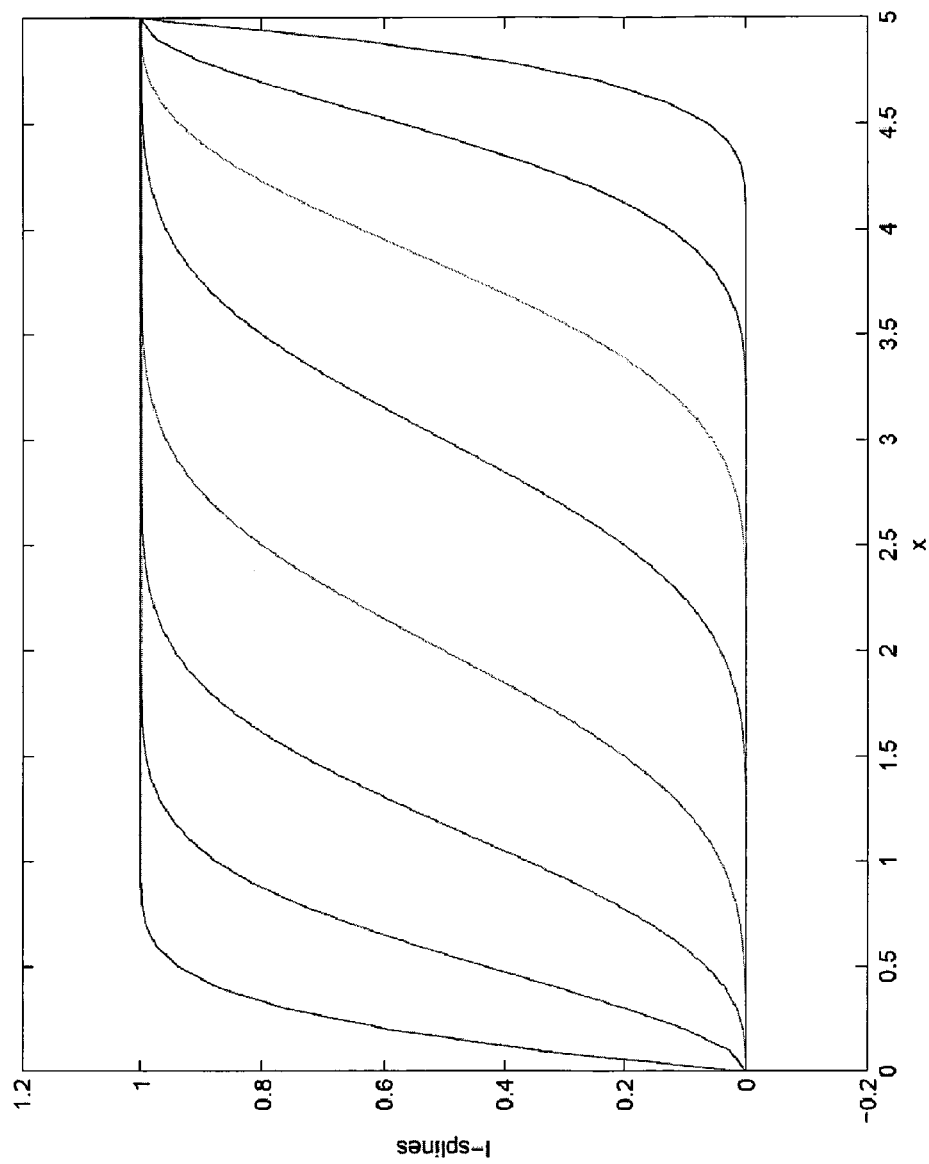
FIG. 3 illustrates a number of I-splines in accordance with an embodiment of the present invention.

Now given the $\lambda_p$, we are able to fit the additive model (3). As will be discussed below, the IC is monotone in most of the metrics. Therefore, while we can still fit an unconstrained additive model, a more accurate fit is expected if monotone $f_p$ are fitted. To enable such construction, we define a monotone spline basis proportional to integrated B-splines, called I-splines. Since B-splines are nonnegative, I-splines are non-decreasing. They increase from zero to one, so one minus I-splines gives a non-increasing basis. Note that it is well-known that I-splines can be defined in terms of B-splines. The I-spline basis functions for the same order and knot positions as those for the B-splines above are shown in FIG. 3. To guarantee monotonicity of the fit, the coordinates of $\beta$ are restricted to be nonnegative. More generally, if monotonicity is only required in selected coordinates p, the restriction implies only to those entries of $\beta_{p;j}$ that correspond to these coordinates. Then a nonnegative linear combination of monotone basis functions is monotone. The fitting criterion (5) gives rise to a standard quadratic programming problem where the linear constraints are of the form $\beta_{p;j} \geq 0$. While a standard routine can be used, it can be solved more efficiently via a multiplicative updates method.

The remaining piece of the procedure is model selection. Here we decide what metrics make a significant contribution to model (3) and are retained and also what roughness penalty parameters $\lambda_p$ to use for each retained metric. The optimization of an unconstrained model turns out to be computationally more straightforward. Therefore, even if fitting a monotone model, the optimization is first carried out for the unconstrained model. We first describe unconstrained model selection and then explain how to move to monotone model selection if necessary.

Our unconstrained model selection procedure operates generally as follows. For each p, define a regimen $D_p$ of trial values for $\lambda_p$. By convention, we will always include "skip" for leaving the term out of the model. A regimen might look like this: $D_p = \{1, 2, 4, 8, \infty, \text{skip}\}$. The values are ordered so that the corresponding $f_p$ fits are decreasing in roughness with the final two values standing for the linear fit and for leaving the term out respectively. The Cartesian product D of the $D_p$ is the set of models under consideration. A goodness-of-fit criterion (GOFC) (discussed below) is iteratively minimized over D as follows. For a current model indexed by $(I_1, \ldots, I_p)$ in D, each $I_p$ is moved one value up and one down (if possible) one at a time and the GOFC is computed for (up to) 2P models. If any such move improves the GOFC, the current model is moved according to the largest improvement and the process is repeated.

We now define the GOFC. Ideally, we would like to minimize the cross-validation (CV) error. The idea behind cross-validation is to first split the data into training and validation subsets. The model is then fitted on the training subset and the prediction error is estimated by the distance between the fit and the data over the validation subset. Note that since the validation data are not used in fitting, the criterion makes an objectivity claim. More specifically, for a given set of $\lambda_p$ defining the regression model, we compute the CV error estimate via $$CV \sqrt{\frac{1}{10} \sum_{j=1}^{10} \sum_{i \in I_j} (y_i - \hat{f}_i^{-I_j})^2 / \#I_j}, \quad (7)$$

where $I_1, \ldots, I_{10}$ index mutually exclusive data subsets, #A is the number of elements in set A, and $\hat{f}^{-I_j}$ is the fit evaluated at the data points in $I_j$ that was trained on the whole data set except for $I_j$. Of course, the number ten refers to the number of ways the data set is split into validation subsets.

Note that (7) can be computed for either constrained or unconstrained models. However, it is time consuming to carry out the above optimization. Therefore, generalized CV (GCV) approximation to (7) is often used in unconstrained modeling. Unfortunately, the approximation is not available for constrained models. Let X be the model matrix whose row i entries are the $B_{p;j}((x_i)p)$, the basis functions evaluated at $x_i$. Let $\Omega$ be the roughness penalty matrix, so that the quadratic roughness penalty is equal to $\beta^T \Omega \beta$. $\Omega$ is block-diagonal with blocks $\lambda_p \Omega_p$, defined in (6). The GCV approximation is defined by $$GCV = \sqrt{\frac{\sum_{i=1}^{N} (y_i - \hat{f}_i)^2}{(N - trace(S))^2}}, \quad (8)$$

where $\hat{f}$ are the fitted values at the data points, $S = X(X^T X + \Omega)^- X^T$, the minus superscript denoting a generalized inverse in case the matrix is not of full rank, and the trace(S) is the sum of the diagonal values of S. trace(S) is commonly used as a surrogate for the effective number of parameters in non-parametric modeling. In a parametric context, it is equal to the number of columns in the model matrix. Thus, as the $\lambda_p$ decrease, the fit moves closer to the data (the numerator of (8) decreases), but the fit uses more effective parameters (the denominator decreases as well). Thus, the criterion makes the tradeoff between closeness to the data and model complexity.

The unconstrained model is optimized by minimizing (8) over D as described above. The final model might be evaluated via (7) for a more precise goodness-of-fit characterization.

We have not described how to choose the regimen $D_p$ of trial values for the $\lambda_p$. Let $X_p$ be a matrix for those columns of X that pertain to metric p. One useful method is to use the trace of $S_p = X_p(X_p^T X_p + \lambda_p \Omega_p)^- X_p^T$ as the effective number of parameters for modeling the effect of metric p, also called its degrees of freedom (df). Then the regimen can be defined in terms of the desired df, which is usually a natural scale for model complexity. Reasonable choices include $\{10 \text{ df}, 6 \text{ df}, 3 \text{ df}, 1 \text{ df}, \text{skip}\}$ and $\{6 \text{ df}, 5 \text{ df}, 4 \text{ df}, 3 \text{ df}, 2 \text{ df}, \text{skip}\}$. One then recovers the corresponding $\lambda p$ and puts them into $D_p$.

If we decide to fit a constrained model, our proposal is first to optimize the corresponding unconstrained model. The unconstrained model is fitted using I-spline bases instead of B-splines. While we can no longer take advantage of the banded matrices, the theory above carries over. In particular, the span of I-splines is the same as that of B-splines, so the difference is only in the representation for the potential models.

Suppose the unconstrained model indexed by $(\hat{\lambda}_1, \ldots, \hat{\lambda}_p)$ is chosen. Recall that some of the $\lambda_p$ can be "skip" for dropping metrics from the model. To fit the constrained model, we will optimize $$\sum_{i=1}^{N} (y_i - f(x_i))^2 + \Lambda \sum_{p=1}^{P} \hat{\lambda} \int (f_p''(x_p))^2 dx_p, \quad (9)$$

with respect to the overall roughness penalty coefficient $\Lambda$. Thus, the univariate effects retain their relative smoothness and since this optimization is univariate, it is feasible to use the CV directly as a GOFC.

Definition of the Distance Measure

Let the fitted regression function be $$\hat{f}(x) = \sum_{p \in P} \hat{f}_p(x_p), \quad (10)$$

where P is the set of chosen metrics. Our next goal is to define a distance measure $\rho$ between any two workloads based on their metric vectors. We would like $\rho$ to be small whenever two workloads have similar performance relevant metrics that result in similar performance. Similar performance alone does not make two workloads similar. For example, large memory footprint of benchmark A together with its small network requirements might result in performance similar to that of benchmark B, whose requirements are the other way around. However, it is clear that optimized architectures for two such benchmarks are expected to be quite different. Also, a difference between two benchmarks in metrics that do not explain performance is not of interest. On the contrary, we would like the individual metrics to contribute into the distance definition according to their effect on performance. We interpret the $\hat{f}_p$ as the effect of metric p. Therefore, we propose the following definition:

$$\rho(u, v) = \sum_{p \in P} |\hat{f}_p(u_p) - \hat{f}_p(v_p)|. \quad (11)$$

Note that the difference between two metric values enters (11) as the difference it makes on the expected performance according to (10). The greater its impact on the IC, the greater is the corresponding summand in (11). For example, if $\hat{f}_{p(s)} = \hat{a}_p s$ were linear, then $$|\hat{f}_p(u_p) - \hat{f}_p(v_p)| = |\hat{a}_p||u_p - v_p|,$$

and so $|\hat{a}_p|$ can be interpreted as the weight for metric p. In particular, metrics not used (10) in do not contribute to the distance definition.

Clustering Workloads

As we mentioned in the introduction, clustering provides a way of visualizing similarities among workloads as defined by the pair-wise distances. Additionally, clustering can be used to segment the workload space to make sure that different segments are explored sufficiently well with thoroughly studied benchmarks. In this section, we give details of the average linkage clustering algorithm. Its implementation is part of many software packages, such as Matlab.

The technique builds a hierarchical clustering tree by choosing two clusters at a time to be aggregated into one. The two clusters are the closest pair. Inter-cluster distances are defined as the average (thus, average linkage) among all inter-cluster pairs. More precisely, the distance between clusters $C_1$ and $C_2$ is given by, $$\rho(C_1, C_2) = \text{Average}_{u \in C_1, v \in C_2} \rho(u, v)$$

With a slight abuse of notation, we do not distinguish between a workload and its metric vector.

Let us illustrate the procedure with a small example. Suppose we have five workloads that we want to cluster based on a unique metric whose values are 1, 2, 5, 6, and 15 for the five workloads, respectively. The distance used is the absolute value distance.

Figure 4:
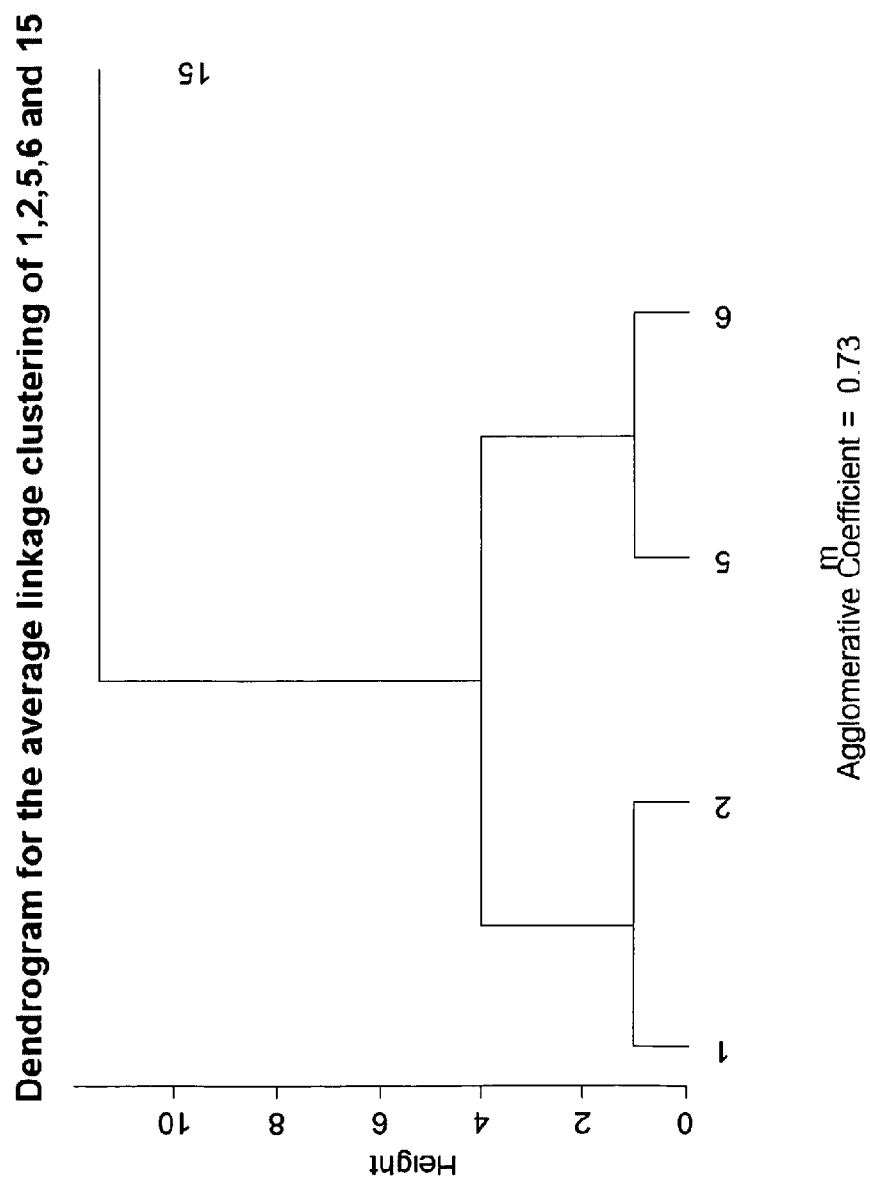
FIG. 4 illustrates an exemplary dendogram in accordance with an embodiment of the present invention.

During the first step, the first two are aggregated into a cluster, since their distance of one is smallest. Next, five and six are aggregated. Thus, we have three clusters: $C_1 = \{1,2\}$, $C_2 = \{5,6\}$, and $C_3 = \{15\}$. The distance between $C_1$ and $C_2$ is $(|1-5|+|1-6|+|2-5|+|2-6|)/4 = 4$, which is clearly less than the distance from either $C_1$ or $C_2$ to $C_3$. Therefore, $C_1$ and $C_2$ are aggregated. A convenient way to represent this process is via a dendrogram depicted in FIG. 4.

The dendogram tree summarizes cluster aggregation and the height of each link is the distance between the two clusters that are being aggregated. For example, the link at the height of four aggregates clusters $C_1$ and $C_2$ above. Clustering is obtained by stopping the aggregation process, for example, when the desired number of clusters is reached or using inference for stoppage. This is equivalent to a horizontal cut through the links of the dendrogram.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for characterizing computer system workloads, comprising:
    collecting metrics for a number of workloads of interest as the workloads of interest execute on a computer system and storing the collected metrics in a file;
    using the metrics to build a statistical regression model, wherein the statistical regression model uses a performance indicator as a response, and uses the metrics as predictors;
    defining a distance metric between workloads, wherein the distance between two workloads is a function of the differences between metric values for the two workloads, wherein the differences are weighted by corresponding coefficients for the metric values in the statistical regression model;
    using the distance metric to analyze similarities between workloads; and
    displaying results of the analysis to a user.

2. The method of claim 1, wherein prior to building the statistical regression model, the method further comprises performing a linear analysis on the collected metrics to eliminate metrics that highly correlated with other metrics, thereby reducing the number of metrics that need to be considered.

3. The method of claim 1, wherein the performance indicator for the statistical regression model includes an instruction count for the number of instructions executed on the computer system.

4. The method of claim 3, wherein the statistical regression model represents the instruction count as an additive function of the metrics plus noise, wherein the noise represents effects not captured by the metrics.

5. The method of claim 1, wherein after building the statistical regression model, metrics that do not explain the performance indicator are not subsequently used.

6. The method of claim 1, further comprising:
using the distance metric to cluster a set of workloads; and
identifying one or more representative workloads for each cluster.

7. The method of claim 1, wherein using the distance metric to analyze similarities between workloads involves identifying a set of representative benchmarks by using the distance metric to minimize a maximum distance between representative benchmarks and a set of workloads that the benchmarks are meant to cover.

8. The method of claim 1, further comprising using the distance metric to classify a customer's workload at a customer's site.

9. The method of claim 1,
wherein using the distance metric to analyze similarities between workloads involves selecting a benchmark that approximates a customer's workload; and
wherein the method further comprises selecting an architecture for the customer which is optimized for the selected benchmark, and is hence likely to perform well on the customer's workload.

10. The method of claim 1, wherein collecting the metrics involves collecting the metrics from hardware counters on the computer system.

11. A computer-readable storage medium storing instructions that when executed by a computer cause the computer to perform a method for characterizing computer system workloads, the method comprising:
collecting metrics for a number of workloads of interest as the workloads of interest execute on a computer system and storing the collected metrics in a file;
using the metrics to build a statistical regression model, wherein the statistical regression model uses a performance indicator as a response, and uses the metrics as predictors;
defining a distance metric between workloads, wherein the distance between two workloads is a function of the differences between metric values for the two workloads, wherein the differences are weighted by corresponding coefficients for the metric values in the statistical regression model;
using the distance metric to analyze similarities between workloads; and
displaying results of the analysis to a user.

12. The computer-readable storage medium of claim 11, wherein prior to building the statistical regression model, the method further comprises performing a linear analysis on the collected metrics to eliminate metrics that highly correlated with other metrics, thereby reducing the number of metrics that need to be considered.

13. The computer-readable storage medium of claim 11, wherein the performance indicator for the statistical regression model includes an instruction count for the number of instructions executed on the computer system.

14. The computer-readable storage medium of claim 13, wherein the statistical regression model represents the instruction count as an additive function of the metrics plus noise, wherein the noise represents effects not captured by the metrics.

15. The computer-readable storage medium of claim 11, wherein after building the statistical regression model, metrics that do not explain the performance indicator are not subsequently used.

16. The computer-readable storage medium of claim 11, wherein the method further comprises:
using the distance metric to cluster a set of workloads; and
identifying one or more representative workloads for each cluster.

17. The computer-readable storage medium of claim 11, wherein using the distance metric to analyze similarities between workloads involves identifying a set of representative benchmarks by using the distance metric to minimize a maximum distance between representative benchmarks and a set of workloads that the benchmarks are meant to cover.

18. The computer-readable storage medium of claim 11, wherein the method further comprises using the distance metric to classify a customer's workload at a customer's site.

19. The computer-readable storage medium of claim 11,
wherein using the distance metric to analyze similarities between workloads involves selecting a benchmark that approximates a customer's workload; and
wherein the method further comprises selecting an architecture for the customer which is optimized for the selected benchmark, and is hence likely to perform well on the customer's workload.

20. The computer-readable storage medium of claim 11, wherein collecting the metrics involves collecting the metrics from hardware counters on the computer system.

21. A system that characterizes computer system workloads, comprising:
a processor;
a memory;
a receiving mechanism within the processor and the memory configured to receive metrics for a number of workloads of interest as the workloads of interest execute on a computer system and to store the collected metrics in a file;
a modeling mechanism within the processor and the memory configured to use the metrics to build a statistical regression model, wherein the statistical regression model uses a performance indicator as a response, and uses the metrics as predictors;
a distance-metric generator within the processor and the memory configured to defining a distance metric between workloads, wherein the distance between two workloads is a function of the differences between metric values for the two workloads, wherein the differences are weighted by corresponding coefficients for the metric values in the statistical regression model;
an analysis mechanism configured to use the distance metric to analyze similarities between workloads; and
an output mechanism configured to display results of the analysis to a user.

* * * * *